US007506536B2

(12) United States Patent
Cornwell et al.

(10) Patent No.: US 7,506,536 B2
(45) Date of Patent: Mar. 24, 2009

(54) METHOD OF DERIVING ENGINE CYLINDER MECHANICAL TOP DEAD CENTRE

(75) Inventors: Richard Charles Elliot Cornwell, Shoreham-By-Sea (GB); Edward Colin Winslett, Brighton (GB); Andrew David Noble, Steyning (GB); Brian Gorman Cooper, Merstham (GB); Anthony Truscott, Worthing (GB); David Greenwood, Shoreham-By-Sea (GB); Nicola Di Lieto, München (DE)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 10/536,619

(22) PCT Filed: Oct. 20, 2003

(86) PCT No.: PCT/GB03/04522

§ 371 (c)(1),
(2), (4) Date: Aug. 25, 2006

(87) PCT Pub. No.: WO2004/048762

PCT Pub. Date: Jun. 10, 2004

(65) Prior Publication Data

US 2006/0293829 A1 Dec. 28, 2006

(30) Foreign Application Priority Data

Nov. 27, 2002 (GB) ................................ 0227672.3

(51) Int. Cl.
*G01M 15/00* (2006.01)

(52) U.S. Cl. ................................ 73/114.28; 73/114.16

(58) Field of Classification Search .............. 73/114.16, 73/114.17, 114.22, 114.26, 114.27, 114.28, 73/114.29

See application file for complete search history.

(56) References Cited

U.S. PATENT DOCUMENTS

| | | | |
|---|---|---|---|
| 4,455,980 | A | 6/1984 | Sasayama et al. |
| 4,531,499 | A | 7/1985 | Eckert et al. |
| 4,562,728 | A | 1/1986 | Timmerman |
| 4,744,243 | A | 5/1988 | Tanaka |

(Continued)

FOREIGN PATENT DOCUMENTS

| | | |
|---|---|---|
| DE | 100 34 390 | 5/2002 |

(Continued)

OTHER PUBLICATIONS

Stone, *Introduction to Internal Combustion Engines*, 2d Edition, Macmillan Press, 1992, pp. 476-477.

*Primary Examiner*—Eric S McCall
(74) *Attorney, Agent, or Firm*—Cowan, Liebowitz & Latman, P.C.

(57) ABSTRACT

An in-cylinder pressure sensor obtains a high resolution pressure curve for each cylinder cycle allowing the various data to be derived for improved monitoring and control of operation of the engine. A more accurate measure of work done by the engine is obtained allowing more accurate estimation of the vehicle torque and hence real torque control. In addition engine losses can be more accurately calculated and the estimates corrected yet further by obtaining an accurate top dead centre position for the engine cylinders.

6 Claims, 7 Drawing Sheets

U.S. PATENT DOCUMENTS

| | | | | |
|---|---|---|---|---|
| 5,611,311 | A | 3/1997 | Tomisawa | |
| 6,148,795 | A | 11/2000 | Gerhardt et al. | |
| 6,230,683 | B1 | 5/2001 | zur Loye et al. | |
| 6,732,589 | B2 | 5/2004 | Eickhoff et al. | 73/715 |
| 7,117,080 | B2 * | 10/2006 | Sobel | 701/114 |
| 7,278,303 | B2 * | 10/2007 | Piewek et al. | 73/114.16 |
| 2006/0086176 | A1 * | 4/2006 | Piewek et al. | 73/35.12 |
| 2008/0249677 | A1 * | 10/2008 | Kruger | 701/29 |

FOREIGN PATENT DOCUMENTS

| | | |
|---|---|---|
| DE | 100343901.2 | 5/2002 |
| EP | 0 199 431 | 10/1986 |
| EP | 0 686 761 | 12/1995 |
| EP | 0 904 972 | 3/1999 |
| GB | 2 331 154 | 5/1999 |
| WO | WO 02/095191 | 11/2002 |

* cited by examiner

METHOD OF DERIVING ENGINE CYLINDER MECHANICAL TOP DEAD CENTRE

CROSS-REFERENCE TO RELATED APPLICATIONS

This application claims priority to International Application No. PCT/GB2003/004522 filed Oct. 20, 2003, which claims priority to British application No. 0227672.3 filed Nov. 27, 2002, the entire disclosure of which is hereby incorporated by reference.

REFERENCE TO RELATED APPLICATIONS

The invention relates to a system and method providing improved engine management and in particular using real time cylinder pressure data. The aspects discussed herein are an extension of the concepts disclosed in International patent application no. PCT/GB02102385 entitled "Improved Engine Management" commonly assigned herewith and incorporated herein by reference.

BACKGROUND OF THE INVENTION

Known engine management systems (EMS) monitor and control the running of an engine in order to meet certain pre-set or design criteria. Typically these are good driveability coupled with high fuel efficiency and low emissions. One such known system is shown schematically in FIG. 1. An internal combustion engine 10 is controlled by an engine control unit 12 which receives sensor signals from a sensor group designated generally 14 and issues control signals to an actuator group designated generally 16. The engine control unit 12 also receives external inputs from external input block 18 as discussed in more detail below.

Based on the engine performance data derived from the sensor input from the sensor block 14 and any external input from the external input block 18 the engine control unit (ECU) optimises engine performance by varying the relevant performance input variable within the specified criteria.

Typically the sensor block 14 may include sensors including mass air flow sensors, inlet temperature sensors, knock detection sensors, cam sensor, air/fuel ratio (AFR) or lambda ($\lambda$) sensors, and engine speed sensors. The external input block 18 typically includes throttle or accelerator sensors, ambient pressure sensors and engine coolant temperature sensors. In a spark-ignition engine the actuator block 16 typically comprises a fuel injector control and spark plug operation control. In a compression ignition engine the actuator block typically comprises a fuel injector.

As a result, for example in spark ignition engines, under variable load conditions induced by the throttle under driver control, the sensors and actuators enable effective control of the amount of fuel entering the combustion chamber in order to achieve stoichiometric AFR, and of the timing of combustion itself.

Known engine management systems suffer from various problems. EMS technology remains restricted to parameter based systems. These systems incorporate various look-up tables which provide output values based on control parameters such as set-points, boundaries, control gains, and dynamic compensation factors, over a range of ambient and engine operating conditions. For example in spark ignition engines spark timing is conventionally mapped against engine speed and engine load and requires compensation for cold starting. In compression ignition engines fuel injection timing is mapped in a similar manner. As well as introducing a high data storage demand, therefore, known systems require significant initial calibration. This calibration is typically carried out on a test bed where an engine is driven through the full range of conditions mapped into the look-up tables. As a result the systems do not compensate for factors such as variations between engine builds let alone individual cylinders, and in-service wear. Accordingly the look-up tables may be inaccurate ab initio for an individual engine, and will become less accurate still with time.

In one aspect known systems control vehicle performance based on a consideration of engine conditions together with mappings. These mappings are derived during vehicle calibration and can include physical parameters related to engine geometry. Generally much of the engine performance data is very indirect and is based on multiple inferences from sensors together with the mapped or modelled data which can give rise to inaccuracies arising from the inferences made or from differences between vehicles based on production tolerances or indeed differences between conditions in individual cylinders within an engine. The latter is mainly due to differences in air and inert gas paths, temperatures of the cylinder walls and production tolerances of valvetrain and piston/crankshaft geometry. Furthermore such approaches do not compensate for changes in performance arising from in-service wear.

One known system comprises adjusting performance input variables to the engine to control engine torque to a target. A problem with this is that the engine torque is in fact inferred from easily measurable variables such that airflow in a gasoline engine or fuel flow in a diesel engine. Accordingly the value for torque that is derived is indirect and inaccurate, suffering from the disadvantages set out above. Although torque sensors are known, these are costly and are not robust. Known systems also derive a measure of engine frictional losses represented by the friction mean effective pressure (FMEP). However in known systems these values are currently mapped or modelled at the engine manufacture stage and hence suffer from the problems set out above.

The invention is set out in the claims.

BRIEF DESCRIPTION OF THE FIGURES.

Embodiments of the invention will now be described by way of example with reference to the drawings, of which.

DESCRIPTION OF THE PREFERRED EMBODIMENT

Figure 1:
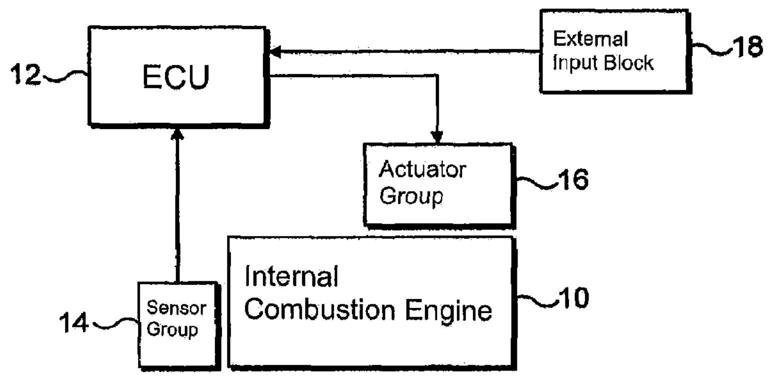
FIG. 1 Prior Art
FIG. 1 is a block diagram representing a prior art EMS.

The following discussion of an embodiment of the invention relates to its implementation in relation to a four stroke combustion ignition engine comprising a diesel engine. However it will be appreciated that the invention can be applied equally to other stroke cycles and types of internal combustion engines including spark-ignition engines, with appropriate changes to the model parameters. Those changes will be apparent to the skilled person and only the best mode presently contemplated is described in detail below. Like reference numerals refer to like parts throughout the description.

Figure 2:
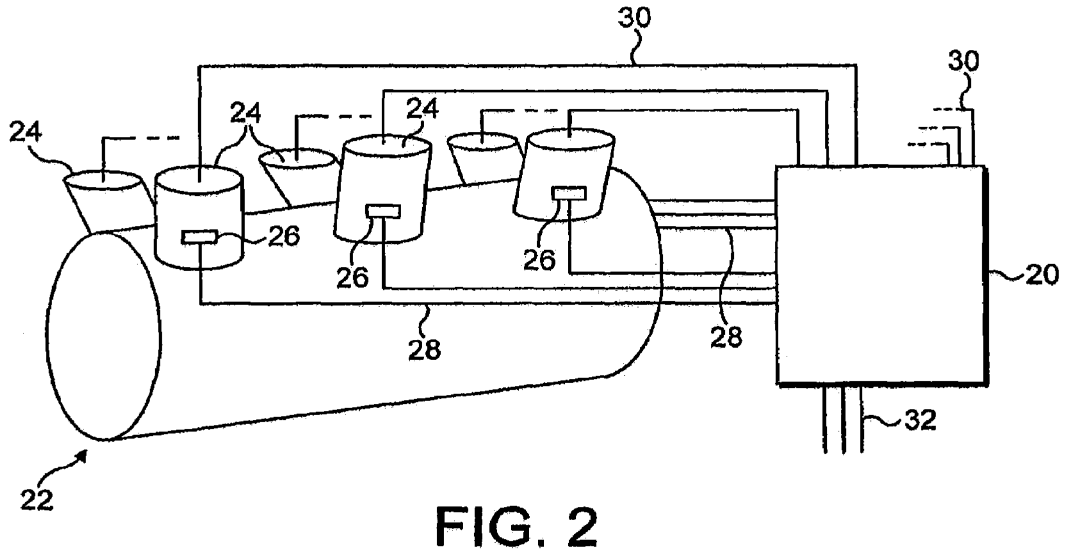
FIG. 2 is a schematic diagram representing an EMS according to the present invention.

FIG. 2 is a schematic view showing the relevant parts of an engine management system according to the present invention in conjunction with a six cylinder engine. An engine control unit is designated generally 20 and controls an engine designated generally 22. The engine includes six cylinders designated generally 24. Each cylinder includes a pressure sensor 26 which connects to the ECU via a line 28. In addition the ECU provides electronic control to each of the cylinder injectors (not shown). The ECU 20 can also receive additional controls and actuator inputs 32 as discussed in more detail below. The engine management system monitors the pressure in each cylinder through each complete engine cycle, namely 720° rotation of the crankshaft in a four-stroke engine. Based on this data the injection timing for each cylinder 24 is varied by varying the timing of each injector via control lines 30.

Figure 3:
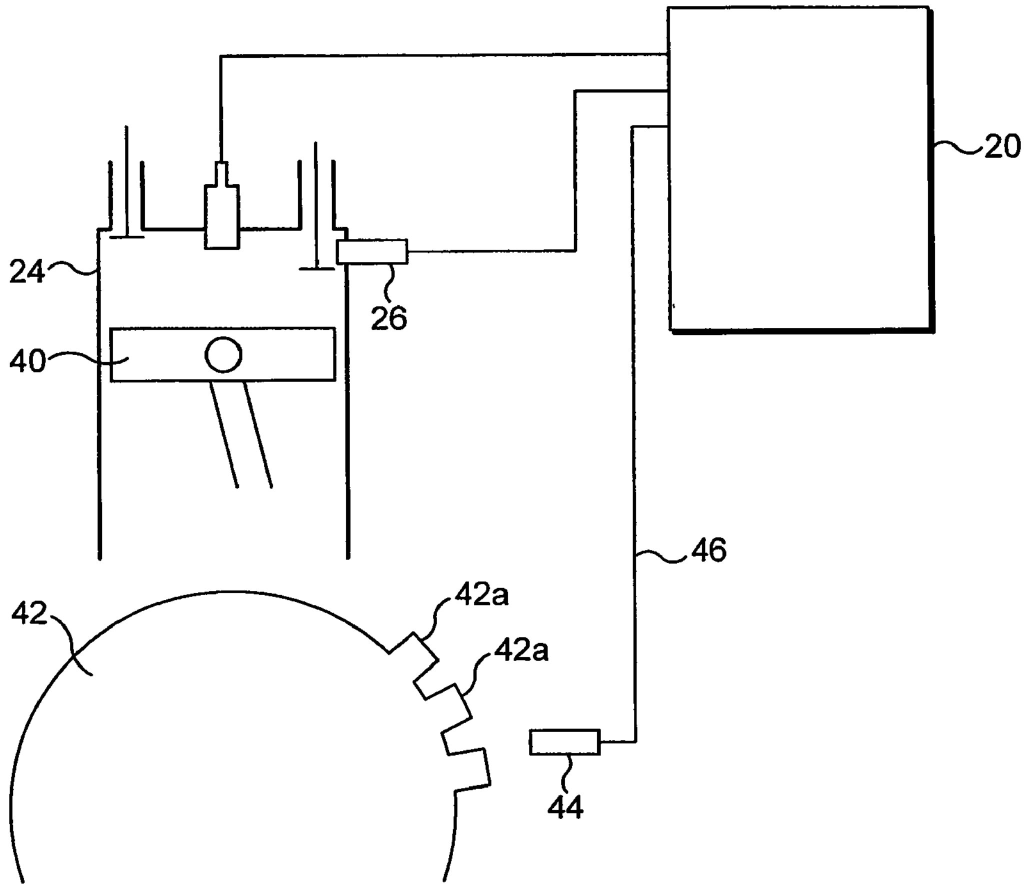
FIG. 3 is a schematic view of a single cylinder in cross section according to the present invention.

In FIG. 3 there is shown schematically a more detailed view of a single cylinder 24 of the engine. The in-cylinder pressure sensor 26 comprises a piezoresistive combustion pressure sensor with a chip made of silicon on insulator (SOI) available from KistlerInstrumente AG, Winterthur, Switzerland as transducer Z17619, cable 4767A2/5/10 and amplifier Z18150. It will be appreciated that any appropriate in-cylinder pressure sensor can be used, however. For example the sensor can be of the type described in co-pending application number DE 100 34 390.2. The pressure sensor 26 takes continuous readings through the four strokes of the piston 40. The readings are crank-synchronous and triggered by crank teeth 42*a* of the crank 42, detected by a crank tooth sensor 44 which sends an appropriate signal via line 46 to the ECU 20. In the preferred embodiment readings are taken every 2° of crankshaft rotation although any desired resolution can be adopted, the limiting factors being processing power and crank angle sensing resolution. For each cylinder the readings are taken across a cycle window of width 720°. As discussed in more detail below with reference to FIG. 16, the window is selected to run from a point substantially before engine top dead centre (TDC) for each cylinder.

The data obtained from the in-cylinder sensor 26 is processed as discussed in more detail below and a high resolution plot of pressure versus crank angle (which can be simply converted to time if the engine speed is known) is obtained for each cylinder and each cycle. From this information, monitoring and control of engine performance is greatly enhanced.

In overview, in the first aspect the invention makes use of the possibility of deriving the work done by each cylinder piston in the engine from in-cylinder measurements of the cylinder pressure. In particular the indicated mean effective pressure (IMEP) is derived from the pressure information combined with the corresponding cylinder volume at each cycle. The brake mean effective pressure (BMEP), which is a measure of engine output torque, at any point from and including the crankshaft to the transmission system, can then be derived from the IMEP and the losses represented by the FMEP which are calibrated or modelled. As a result mapped measurements are restricted to the FMEP calculations rendering the determination of the output torque more accurate. This is then used to adjust the performance input parameters to control the output torque to a target desired output torque providing torque based control.

In a second aspect an estimate or sensed value for the BMEP is obtained and, using the measured value of IMEP the FMEP is derived, again more accurately because of the direct measurement of IMEP. In this case the relevant information which relates to losses in the vehicle can be used for on-board diagnostics (OBD) systems. The derivations of BMEP and FMEP in the respective aspects can be cross-correlated with their respective estimated values in the alternative aspect allowing the mappings or models to be refined based on real vehicle performance and accounting for variations/deterioration with time.

Although the following discussion relates principally to IMEP, it applies equally to equivalent measures of engine output such as torque or power, and appropriate units and conversions should be inferred as appropriate. For example as regards engine shaft output, a measure of this can be expressed as the brake mean effective pressure BMEP as discussed in more detail below, engine output torque, engine output power and so forth. A measure of engine frictional losses may be expressed as the FMEP, as friction torque or as friction power and a measure of work done on the piston of a cylinder can be expressed as the IMEP, indicated torque or indicated power. In each case yet further expressions may be used as appropriate.

In either case IMEP must be calculated which requires a correlation of the measured pressure in the cylinder with the corresponding cylinder volume at any time. The cylinder volume at any time is known from the crank angle which is directly related to the piston position. However because of mechanical tolerances and variations between engines and individual cylinders, the relationship between volume and crankangle may differ slightly between engines and individual cylinders, sufficient to affect the IMEP calculation. Accordingly the invention further extends to obtaining a more accurate measurement of piston top dead centre (TDC) each cylinder and each cycle allowing a correspondingly more accurate measurement of IMEP.

Figure 4:
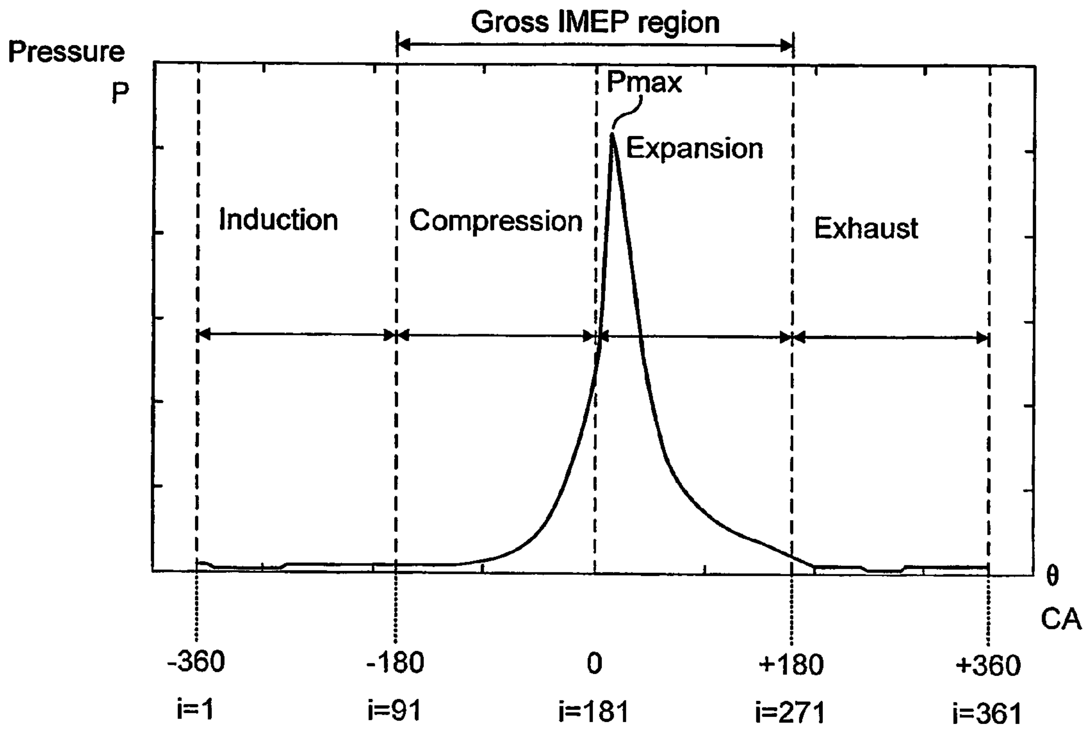
FIG. 4 is a trace of pressure against crank angle for a cylinder cycle of a four stroke engine.

The pressure data derived is shown in FIG. 4 which shows the cylinder pressure variation against crank angle for one full cycle between −360° and +360°. As is well known the engine cycle is divided into four regions, induction from −360° to −180°, compression from −180° to 0° (TDC), expansion from 0° to +180° and exhaust from +180° to 360°, defining a full 720° cycle. Theoretically, for instantaneous combustion occurring over an infinitely small period of time the optimum point for combustion is at 0° TDC, but in practice injection timing can vary by several degrees from TDC.

The pressure curve obtained is then processed to provide additional engine performance data allowing enhanced control.

In the first aspect, the pressure curve is used to obtain a measure of mean engine torque in the form of the BMEP at the engine output based on the direct relationship between BMEP and torque. In particular it can be shown that for a four stroke engine:

$$\frac{BMEP \cdot V_s \cdot N}{2} = \tau \cdot N \cdot 2\pi \tag{1}$$

Where $V_S$=swept volume of all cylinders.

N=number of revolutions and τ=torque.

This can be simplified to $$\tau = \frac{BMEP \cdot V_s}{4\pi} \quad (2)$$

As a result it can be seen that tracking the BMEP allows tracking of the vehicle torque.

Now BMEP is given by the difference between the work done by the engine and the subsequent losses, i.e:

$$BMEP = IMEP - FMEP \quad (3)$$

where the FMEP represents the losses between the net work done by the gases in the cylinders and the point in the engine where BMEP is referenced. These losses are due to crankshaft and piston friction, valvetrain losses, air conditioning, power steering, side mounted electrical machine losses and so forth.

The FMEP can be derived in various manners. In one approach it can be mapped or modelled based on detected engine conditions, with a map or model constructed during engine prototyping. Alternatively the FMEP can be derived by monitoring deceleration (in conjunction with the vehicle road information) during skip firing in an overrun or cranking configuration. Here, as the cylinder is not being fired, the deceleration is caused because of the losses in the vehicle including deceleration owing to gravity when the vehicle is on a slope, aerodynamic losses and mechanical losses in the powertrain which in turn are made up of the losses between the wheels and the point where BMEP is referenced (rolling resistance, transmission and differential losses and so forth), and FMEP. Appropriate sensors models or maps can be used to obtain the value of the relevant losses. At low speeds aerodynamic losses can be ignored and the effect of gravity cancelled out if the road gradient is known (by an inclination sensor, for example). As a result only the mechanical losses need to be estimated to obtain FMEP. Furthermore, when skip-firing individual cylinders, a comparison can be made of their respective FMEPs. This is useful for detecting failures such as piston ring deterioration.

Yet a further approach is to apply the "morse test" which is known to the skilled reader as described in Introduction to Internal Combustion Engines, Richard Stone, Second Edition, Macmillan, 1992, pp 476-477 in which individual cylinders are sequentially skip fired and the RPM loss summed to obtain a measure of the FMEP.

Figure 5:
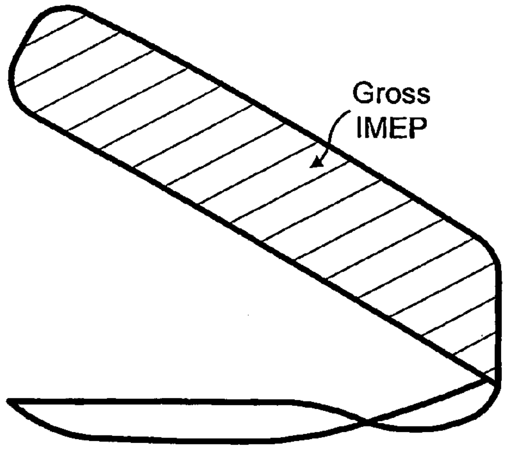
FIG. 5 is a trace showing IMEP for a cylinder cycle.

The work done by the gases on the piston for each engine cycle can be represented by the IMEP over the engine cycle as represented in FIG. 5 which shows a plot of cylinder pressure, P against volume V over a single four-stroke cycle. The area shown shaded is the gross IMEP relating to the work done during the compression and expansion strokes while the area enclosed by the entirety of the plot is the net IMEP relating to the work done over the whole cycle, including work done on the gases by the piston during the induction and exhaust strokes. The gross IMEP region is also shown on the pressure versus crank angle plot of FIG. 4.

Because the samples taken are sufficient to plot the Pressure/Volume curve the IMEP for a single cylinder can be obtained empirically by applying trapezoidal integration yielding, for the net IMEP:

$$IMEP_{net} = \frac{1}{V_{cs}} \sum_{i=1}^{m-1} \frac{P_i + P_{i+1}}{2} (V_{i+1} - V_i) \quad m = \frac{720}{\theta_{res}} \quad (4)$$

where $V_{cs}$ is the swept volume of one cylinder. This net IMEP will be referred to here onwards as 'IMEP'

Figure 7:
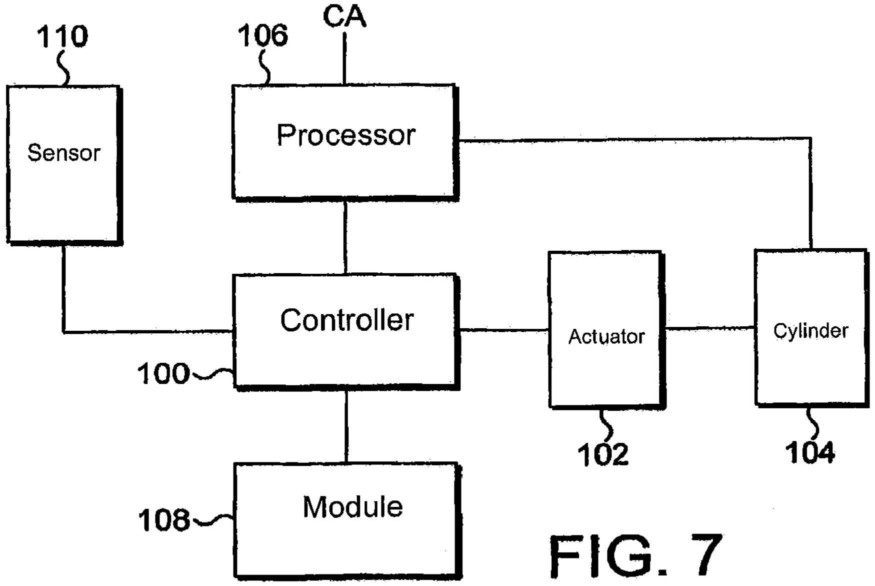
FIG. 7 is a block diagram showing control modules in an engine according to the present invention.

Equation (4) is preferably calculated based on the raw pressure data as the effects of noise are reduced because the IMEP is effectively obtained by integration. Similarly any pressure off-set correction required for medium to long-term sensor drift, is irrelevant to the IMEP calculation since it is a cycle integral of the area enclosed the PV diagram of FIG. 7 and so it is independent of absolute pressure values.

Once the IMEP and FNEP is obtained then the BMEP can be similarly obtained by the above equation. It will be noted that if FMEP is indirectly measured using a skip firing or similar technique then this can be correlated against the mapped or modelled FMEP to refine the map or model appropriately.

As a result, real torque control is obtained where a more accurate model of the engine torque is derived. The engine performance input variables can then be adjusted to track BMEP to a target value demanded by the driver or EMS. This can be done either to optimise vehicle torque or to maintain it stable dependent on the driving mode required. Stability is particularly attractive if the engine is switching between operating modes (for example in order to regenerate exhaust after-treatment systems).

Because the model is based on a restricted set of assumptions it is correspondingly enhanced and hence compensates for variations between engines and cylinders. The real torque based control system hence provides the possibility of improved idle speed control, improved transmission control and improved torque based control during engine mode switching such as switching of air/fuel ratios between stoichiometric, lean and rich mixtures, switches between compression ignition modes such as homogeneous and stratified modes, variations in compression ratio, switches between compression ignition and spark ignition, cylinder de-activation and switches between two stroke and four stroke operation. Yet further the invention provides improved torque control for hybrid engines, for example electric/fuel or bi-fuel hybrids.

In a second aspect a similar approach to that identified above is adopted but to obtain a measure of the losses in the vehicle in the form of the FMEP. FMEP can be obtained by rearranging equation (3) to obtain:

$$FMEP = IMEP - BMEP \quad (5)$$

As discussed above IMEP can be derived from direct in-cylinder pressure measurements during each cylinder cycle.

BMEP can be obtained in a known manner for example by estimation from a vehicle model or from a torque sensor in conjunction where appropriate with factors such as the vehicle weight and road inclination. In that case the estimation of FMEP is enhanced as it is based on reduced assumptions. The FMEP can be used to allow feedback to torque control or can be used in conjunction with the first aspect to allow respective refinement of the BMEP and FMEP values as the values calculated for each by respective equations (3) and (5) can be correlated against the derived values from the model or map.

In one embodiment estimation of FMEP is scheduled at predetermined intervals, for example, a predetermined driven distance allowing vehicle losses to be determined at various intervals and operation according to the first aspect to continue the rest of the time.

As a result the second aspect allows fault or wear diagnosis to be performed by monitoring vehicle losses in the form of FMEP and/or allows enhancement of real torque based control.

It will be seen that both first and second aspects of the invention, i.e. calculation of the BMEP or FMEP rely on an accurate derivation of the engine IMEP. Referring to the equation set out above and FIG. 5, IMEP is obtained by the integration of PdV, requiring $V_i$, the cylinder or volume at a given reading instant i to be known in conjunction with $P_i$. The cylinder volume depends on the piston position which is known from the crank angle. In the preferred embodiment, however, TDC is measured from the pressure data itself allowing the cylinder volume to be more accurately synchronised with the cylinder pressure.

Figure 6:
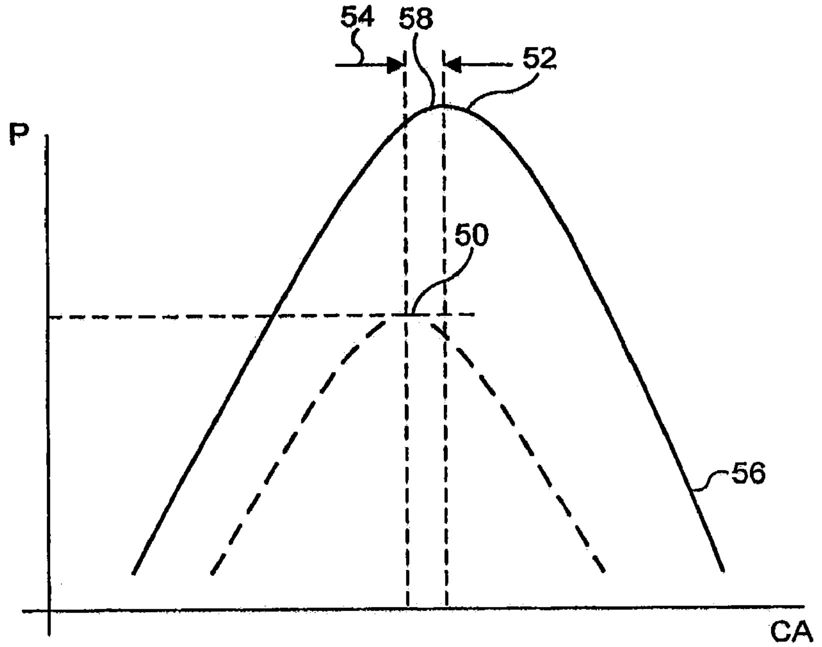
FIG. 6 is a plot of pressure against crank angle $\theta$ showing pressure variation of a motoring pressure curve to demonstrate top dead centre.

Referring to FIG. 6, the specific TDC required is the mechanical TDC 50, that is, the point in time at which the cylinder volume is at a minimum. This differs from the thermodynamic TDC 52 at which the motored cylinder pressure is at a maximum simply because of the thermodynamics of the gas. In particular the thermodynamic TDC 52 will lag the mechanical TDC 50 by a thermodynamic loss angle TLA 54. This lag can be mapped during engine prototyping or modelled, as will be apparent to the skilled reader, from heat release analysis. The engine speed of course needs to be taken into account as this will affect the offset, again as known to the skilled reader. For the purposes of calculated IMEP the mechanical TDC is required as this relates to the actual volume in the cylinder.

Accordingly to obtain TDC, the thermodynamic TDC is first obtained from the motoring curve 56. The motoring curve is the pressure curve that would be obtained if combustion did not take place in the cylinder, representing purely the varying pressure resulting from the compression stroke in the cylinder.

The motoring curve 56 can be derived in various ways known to the skilled person. For example it can be calibrated or obtained by "skip firing" in which at certain intervals fuel is not injected into the cylinder for one cycle (eg during cranking or overrun) and the resultant pressure curve obtained.

Once the motoring curve is derived, then to obtain the thermodynamic TDC the maximum pressure $P_{max}$ 58 is obtained. It will be seen that the value is easily derivable simply by selecting the maximum on the curve as shown in FIG. 6. The relevant point can be identified in any appropriate way, for example by differentiating the curve and identifying the crossover point between positive and negative gradient. Depending on the resolution of the measured data, the maximum can be interpolated between adjacent data points, for example by using polynomial curve fitting techniques as will be well known to the skilled reader.

The mechanical TDC 50 can then be obtained by subtracting the TLA 54, corrected for engine speed, from the thermodynamic TDC. This can then be used to correct the value of V in equation (4). For example the difference between the measured mechanical TDC and the assumed mechanical TDC can be applied as a correction for each value of $V_i$.

As a result a more accurate IMEP value is obtained.

It will be noted that the thermodynamic TDC 52 can also be used directly for example for governing combustion events such as spark time or injection timing control.

As a result the preferred approach compensates for mechanical tolerances as well as in-service wear allowing improved IMEP estimation. TDC can be derived for each cycle or can be measured at predetermined intervals to ensure that the true TDC and assumed TDC remain equivalent.

Any appropriate control mechanism and strategy can be adopted to implement the various enhancements discussed above, as will be apparent to the skilled person. One appropriate system is discussed in overview with reference to FIG. 7 and includes a controller 100, one or more actuators 102, cylinder 104, processor 106 and a module 108 supporting a model or map correlating predetermined values. The measured pressure from the cylinder together with the corresponding crank angle $\theta_a$ are fed to the processor 106 which derives a pressure curve and/or pressure value and from those performance output variables such as temperature, heat release, AFR and so forth as discussed above. These parameters are output to a controller 100 together with other necessary sensor inputs from a sensor or sensors 110.

Where necessary the controller takes these inputs and feeds them to the model or mapping module 108 in order to obtain the desired adjusted performance input variables. The module 108 can be calibrated during engine prototyping on the test-bed, for example, to provide mappings between performance output values such as BMEP and desired performance input variables such as fuel injection timing and quantity.

The adjusted performance input variables are then fed to the relevant actuators 102 which control conditions in the cylinder 104. As a result a feedback loop is provided in which the measured pressure value provides a performance output value which is either controlled to track a target performance output value, or which can be used as a check or correlation against values obtained from the module 108.

It will be appreciated that, where appropriate, instead of closed loop control the pressure value can simply be fed through the processor to obtain a calibrated performance input value at pre-determined intervals or otherwise. It will be further appreciated that the module 108 can be formed at various levels of sophistication, for example providing multiple dimensional mapping tables allowing trade-offs between a plurality of desired performance output values.

Figure 8:
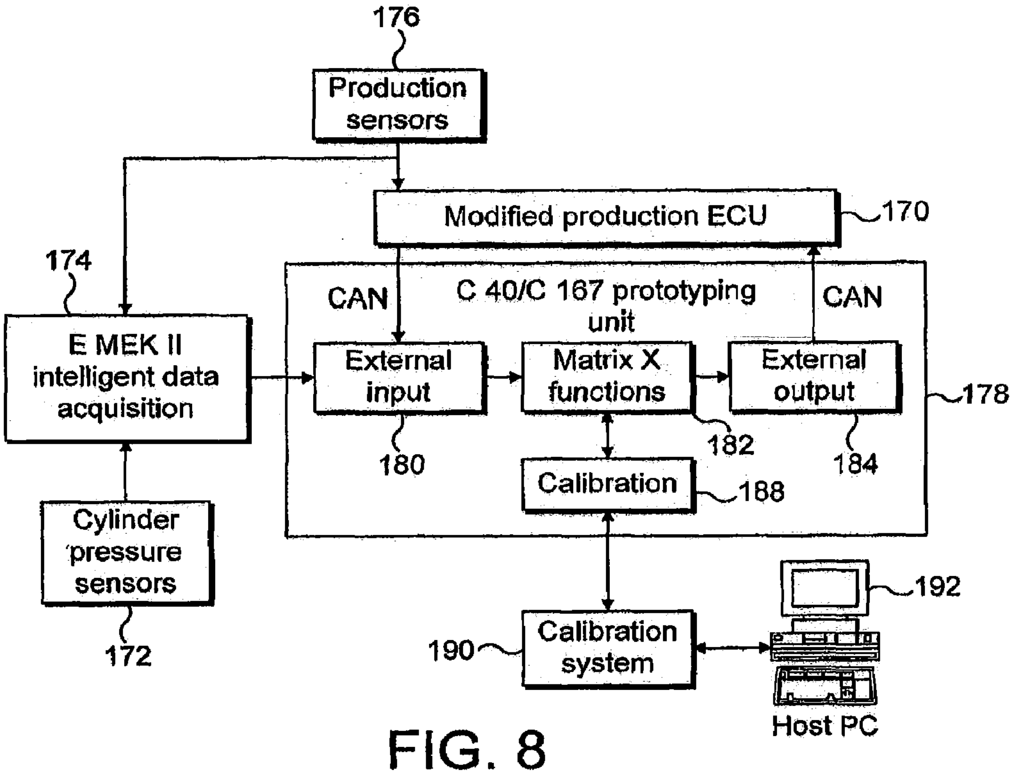
FIG. 8 is a block diagram showing the components of an EMS according to the present invention.
Figure 9:
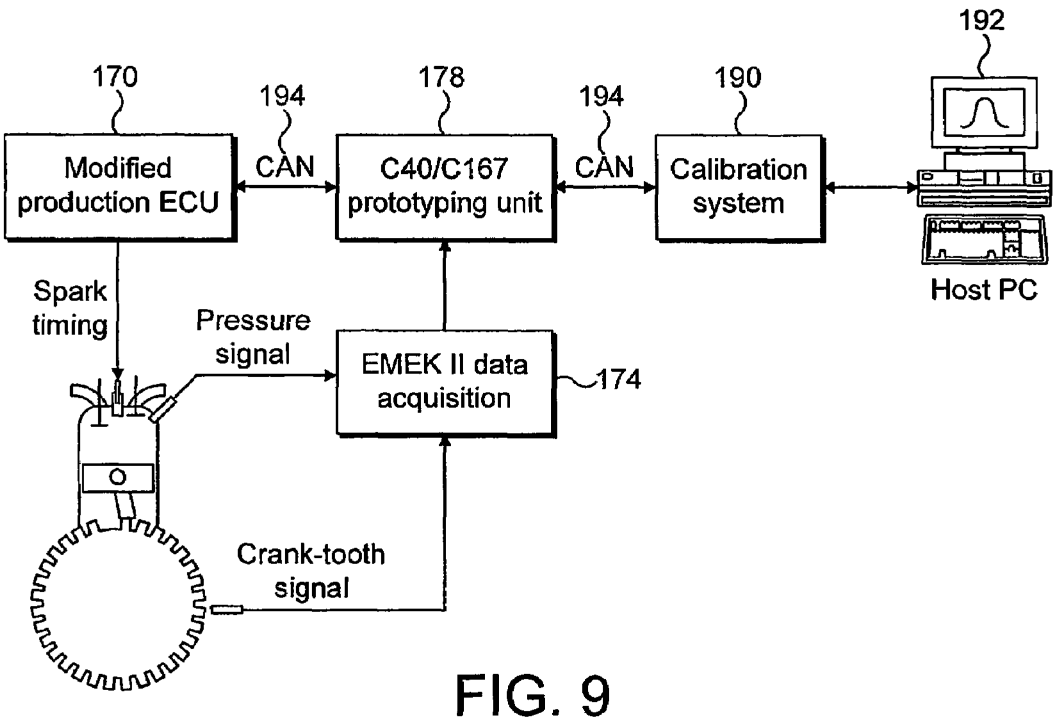
FIG. 9 is a block diagram showing individual cylinder control in an EMS according to the present invention.

A platform for an engine management system according to the present invention is described in more detail with reference to FIGS. 8 to 10 for a system monitoring the pressures in all six cylinders of an engine and providing information concerning fuel quantity and injection timing which override the corresponding outputs of a production engine control unit 170.

Cylinder pressure sensors 172 are digitised by processing means comprising in the preferred embodiment an EMEK II intelligent data acquisition system 174. The data acquisition system also receives signals from sensors 176 which may include, for example, a mass air flow sensor, inlet temperature sensor, cam sensor, air/fuel ratio or lambda sensor or any other appropriate sensors of known type. As can be seen from FIG. 10 the data acquisition system 174 yet further receives a crank tooth signal providing a value of the crank angle (CA).

The digitised signals from the data acquisition system 174 are transmitted to a control and diagnostics unit 178 which may comprise a C40/C167 prototyping unit developed by Hema Elektronik GmbH of Germany. The control and diagnostics unit 178 further receives data including production sensor data from production engine control unit 170 and all input data is received in external input block 180. The control and diagnostics algorithms are configured, in the preferred embodiment, in MatrixX/SystemBuild, a high level simulation and algorithm development tool, and downloaded as compiled code to a digital signal processing (DSP) board generally designated 182. The processed control data is transmitted from an external output block 184 of the control and diagnostics unit 178 to the modified production engine control unit 170 which controls the production actuators including, for example fuel injectors according to their control systems and algorithms discussed above.

It will be seen that the control and diagnostics unit 178 further includes a calibration block 188 which interfaces with an external calibration system 190 connected, for example, to a host PC 192. The calibration system 190 can carry out various calibration steps. For example the performance input variables for obtaining a performance output variable such as a desired BMEP. It will be appreciated that any other appropriate calibration steps can equally be performed, or a model derived equivalently.

The DSP shown generally at block 182 runs separate cylinder pressure based EMS algorithms to implement the control strategies outlined above.

Figure 10:
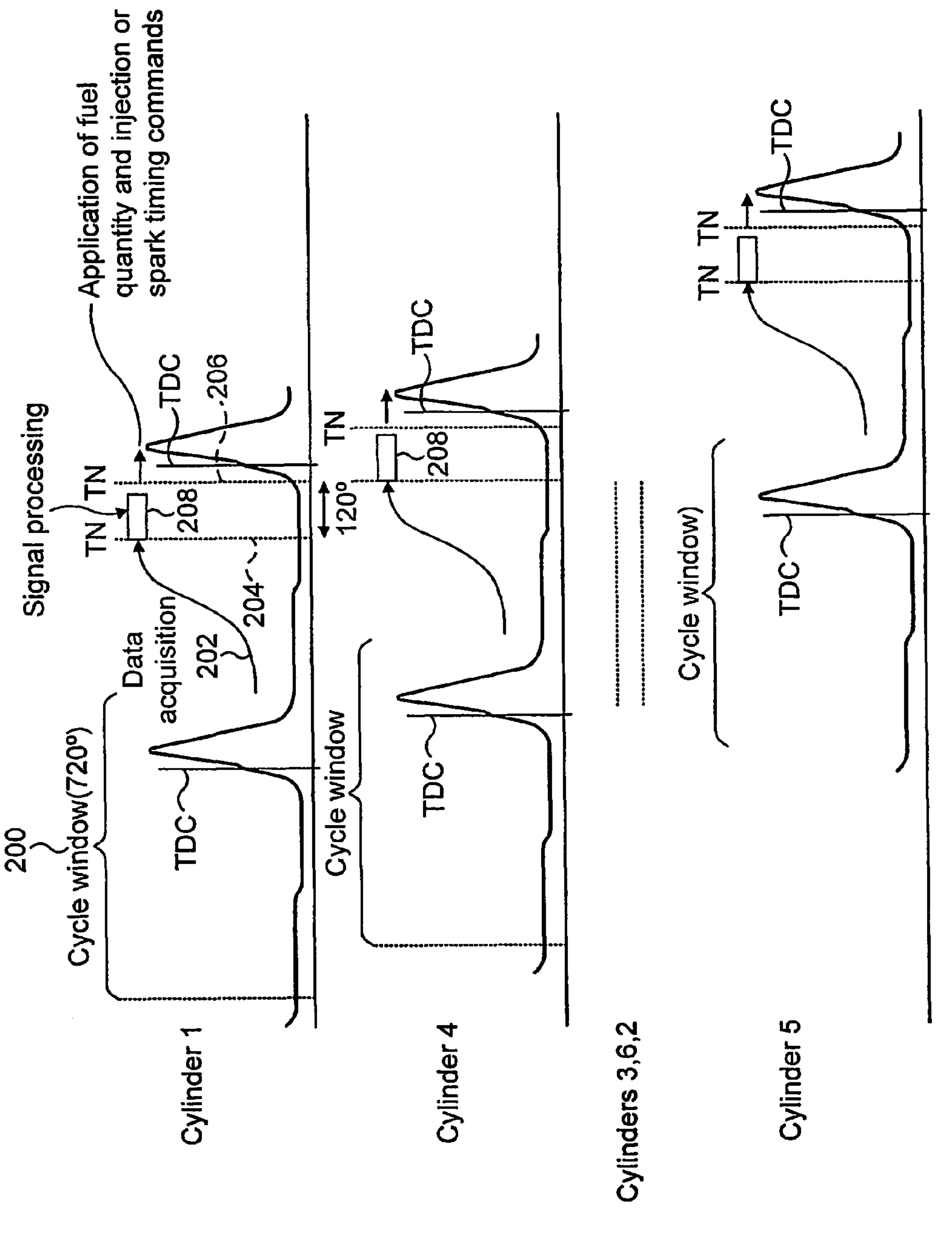
FIG. 10 shows the pressure cycle for the selected cylinder in a six-cylinder engine.

The plot in FIG. 10 is of cylinder pressure against crank angle and it will be seen that, for each cylinder, the cycle window 200 runs over a full 720° cycle from a crank angle significantly before TDC to a crank angle shortly after TDC. This is followed by a data acquisition period 202 allowing the finite processing time required which runs up to a first "TN interrupt" 204. A second TN interrupt 206 occurs 120° later for a six cylinder engine. Crank synchronisation timing and fuel quantity commands derived from the data acquired in the previous cycle window are applied at the second interrupt 206 as a result of which signal processing 208 must take place within the interval between the first and second interrupts. It will be noted that as the engine speed increases, although the crank angle interval between the first and second interrupts remains the same, in the time domain the interval decreases accordingly such that the signal processing step 208 must be implemented efficiently so as not to overlap the second TN interrupt. For example referring to the second plot of FIG. 10, in cylinder 4, it will be seen that the signal processing step 208 is carried out at a higher engine speed and hence falls closer to the second TN interrupt.

The ordering of the cylinders in FIG. 11 is 1, 4, 3, 6, 2, 5.

In the preferred embodiment the timing commands generated in control and diagnostics unit 178 are transmitted via the control area network (CAN) bus 194 to the production ECU 170 where they bypass the normal commands generated by the production control algorithms. As a result the system can be "bolted on" in a preferred embodiment to an existing production ECU 170 with the logic appropriately modified to allow priority to the modified system in controlling production actuators.

It will be appreciated that the various embodiments discussed can be combined or interchanged and components therefrom combined or interchanged in any appropriate manner. In particular multiple control regimes can be combined and traded off against one another so as to achieve a compromise mode of operation meeting more than one target output performance value. The approach can be applied in engine types of different configurations, stroke cycles and cylinder numbers and to different fuel type or combustion type internal combustion engines including natural gas engines and spark or compression ignition type engines and to different injection processes such as port-injection, direct injection, Late Compression Ignition (LCI), Homogeneous Charge Compression Ignition (HCCI) etc. a combination of both, multi-injection and multi-injector engines in which case the in-cylinder pressure data can be processed generally as discussed above but modified appropriately to obtain data on the equivalent parameters, which data can then be applied to appropriate actuation points dependent upon the engine type. Although the discussion above is principally applied to taking readings and applying on a cylinder-by-cylinder and cycle-by-cycle basis, averaging techniques can be applied over multiple cylinders or cycles as appropriate.

The invention claimed is:

1. A method of deriving engine cylinder mechanical top dead centre comprising measuring cylinder pressure during a cylinder cycle, constructing a pressure variation function and deriving a thermodynamic top dead centre therefrom, wherein said thermodynamic top dead centre is derived at a maximum pressure point of a motoring pressure curve and wherein the mechanical top dead centre is obtained by applying an offset to the thermodynamic top dead centre, wherein said offset is a measure of a thermodynamic loss angle between the thermodynamic top dead centre and the mechanical top dead centre.

2. A method as claimed in claim 1 in which the motoring pressure is derived by skip firing an engine cylinder.

3. A method as claimed in claim 1 in which the maximum pressure is interpolated from the motoring pressure curve.

4. A method as claimed in claim 1 in which the offset is derived from a map or model.

5. A method as claimed in claim 1 further comprising the timing of a combustion event in an engine cylinder by obtaining a combustion timing control value as a function of the derived top dead centre.

6. A method as claimed in claim 5 in which a combustion event comprises a spark induced event of a compression induced event.

* * * * *